(12) United States Patent
Kong

(10) Patent No.: US 8,880,845 B2
(45) Date of Patent: Nov. 4, 2014

(54) MEMORY SYSTEM AND OPERATING METHOD THEREOF

(75) Inventor: In Wook Kong, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 217 days.

(21) Appl. No.: 13/469,462

(22) Filed: May 11, 2012

(65) Prior Publication Data

US 2012/0290813 A1    Nov. 15, 2012

(30) Foreign Application Priority Data

May 13, 2011    (KR) .......... 10-2011-0045375

(51) Int. Cl.
*G06F 9/26* (2006.01)
*G06F 12/10* (2006.01)

(52) U.S. Cl.
CPC ........ *G06F 12/1009* (2013.01); *G06F 12/1027* (2013.01); *G06F 12/1081* (2013.01)
USPC ...................................................... 711/206

(58) Field of Classification Search
USPC ...................................................... 711/206
See application file for complete search history.

(56) References Cited

U.S. PATENT DOCUMENTS

| | | | |
|---|---|---|---|
| 2003/0122836 A1 | 7/2003 | Doyle et al. | |
| 2005/0024661 A1* | 2/2005 | Akashi | 358/1.9 |
| 2005/0033934 A1 | 2/2005 | Paladini et al. | |
| 2006/0044418 A1 | 3/2006 | Okabe | |
| 2009/0292899 A1* | 11/2009 | Mansell et al. | 711/207 |
| 2010/0156917 A1 | 6/2010 | Lee et al. | |
| 2012/0246381 A1* | 9/2012 | Kegel et al. | 711/6 |

FOREIGN PATENT DOCUMENTS

KR    10-2004-0072696    8/2004
KR    10-2010-0073029    7/2010

OTHER PUBLICATIONS

English Abstract for Publication No. 10-2004-0072696.
English Abstract for Publication No. 10-2010-0073029.

* cited by examiner

*Primary Examiner* — Charles Rones
*Assistant Examiner* — Nanci Wong
(74) *Attorney, Agent, or Firm* — F. Chau & Associates, LLC

(57) ABSTRACT

A memory system includes a memory including a page table, and an input/output memory management unit (I/O MMU) connected to the memory, and configured to receive a virtual address from an I/O Device and to search within the I/O MMU for a plurality of entries matching the virtual address. If no entries matching the virtual address are found within the I/O MMU as a result of searching for the entries, the I/O MMU accesses the memory, searches the page table for the entries matching the virtual address, and stores the entries within the I/O MMU.

17 Claims, 11 Drawing Sheets

MEMORY SYSTEM AND OPERATING METHOD THEREOF

CROSS-REFERENCE TO RELATED APPLICATIONS

This application claims priority under 35 U.S.C. §119(a) from Korean Patent Application No. 10-2011-0045375 filed on May 13, 2011, which is hereby incorporated by reference in its entirety.

TECHNICAL FIELD

The present invention relates to a memory system and operating method thereof, and more particularly, to a memory system for improving performance deterioration and an operating method of the memory system.

DESCRIPTION OF THE RELATED ART

A memory management unit (MMU) translates a virtual address generated by a central processing unit (CPU) for a bus transaction into a physical address. A cache structure referred to as a translation lookaside buffer (TLB) is used to reduce the memory access load of the MMU. With the advancement of systems, it becomes necessary for individual input/output (I/O) devices to operate using virtual addresses, and therefore, the MMU that has been connected only to the CPU is also connected to the individual I/O devices. Such MMU is referred to as an I/O-MMU (or a system-MMU). However, when the I/O-MMU is used for a particular device, e.g., an image rotator, among the I/O devices, the performance of a system may deteriorate.

SUMMARY

According to some embodiments of the present invention, there is provided a memory system including a memory including a page table; and an input/output memory management unit (I/O MMU) connected to the memory, and configured to receive a virtual address from an I/O Device and to search for a plurality of entries matching the virtual address.

If no entries matching the virtual address are found within the I/O MMU as a result of searching for the entries, the I/O MMU accesses the memory, searches the page table for the entries matching the virtual address, and store the entries within the I/O MMU.

According to other embodiments of the present invention, there is provided a memory system including a memory including a page table; a central processing unit (CPU) configured to generate a first virtual address; a memory management unit (MMU) connected to the memory and configured to manage the CPU's access to the memory, to receive the first virtual address from the CPU, and to map the first virtual address to a first physical address of the memory; and an I/O MMU connected to the memory, and configured to receive a second virtual address, and to search for a plurality of entries matching the second virtual address.

According to further embodiments of the present invention, there is provided an operating method of a memory system. The operating method includes an I/O MMU reading a virtual address from at least one I/O device; searching for an input/output translation lookaside buffer (I/O-TLB) entry matching the virtual address and thereby determining an I/O-TLB miss or hit; and if the I/O-TLB miss is the result, accessing a memory, searching a page table in the memory for a plurality of entries corresponding to the virtual address, and storing the entries in an internal buffer of the I/O MMU.

According to other embodiments of the present invention, there is provided a memory system into which may be introduced a CPU, an I/O device, and a memory device. The memory system comprises: a memory management unit (MMU) configured to be connected to a memory to be accessed by a central processing unit (CPU) configured to generate a first virtual address, and accessed by an I/O Device configured to generate a second virtual address, wherein the memory management unit (MMU) is configured to manage the CPU's access to the memory, configured to receive the first virtual address from the CPU, and configured to translate the first virtual address into a first physical address in the memory; and an input/output memory management unit (I/O MMU) configured to be connected to the memory, and configured to receive the second virtual address from the I/O Device, and to translate the second virtual address into a second physical address in the memory.

The I/O MMU is configured to translate the second virtual address into a second physical address in the memory by: searching outside of the memory for at least one entry matching the second virtual address; and, if no entry matching the second virtual address is found by the I/O MMU as a result of searching outside of the memory, then the I/O MMU accesses the memory and searches the memory for at least one entry matching the second virtual address, and stores the found at least one entry outside of the memory.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these teams. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE EXEMPLARY EMBODIMENTS

Figure 1:
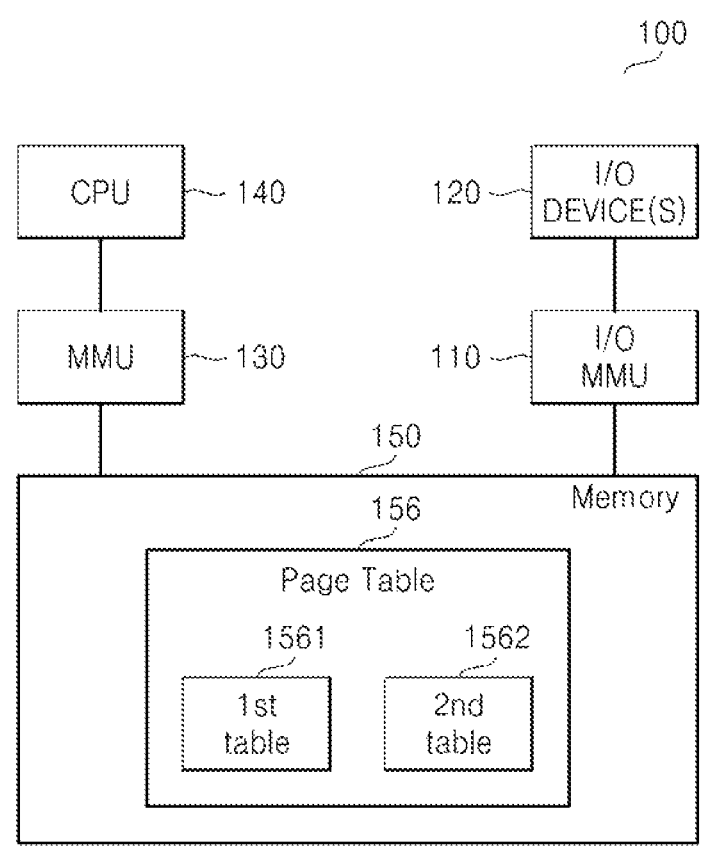
FIG. 1 is a block diagram of a memory system according to some exemplary embodiments of the present invention.
Figure 2:
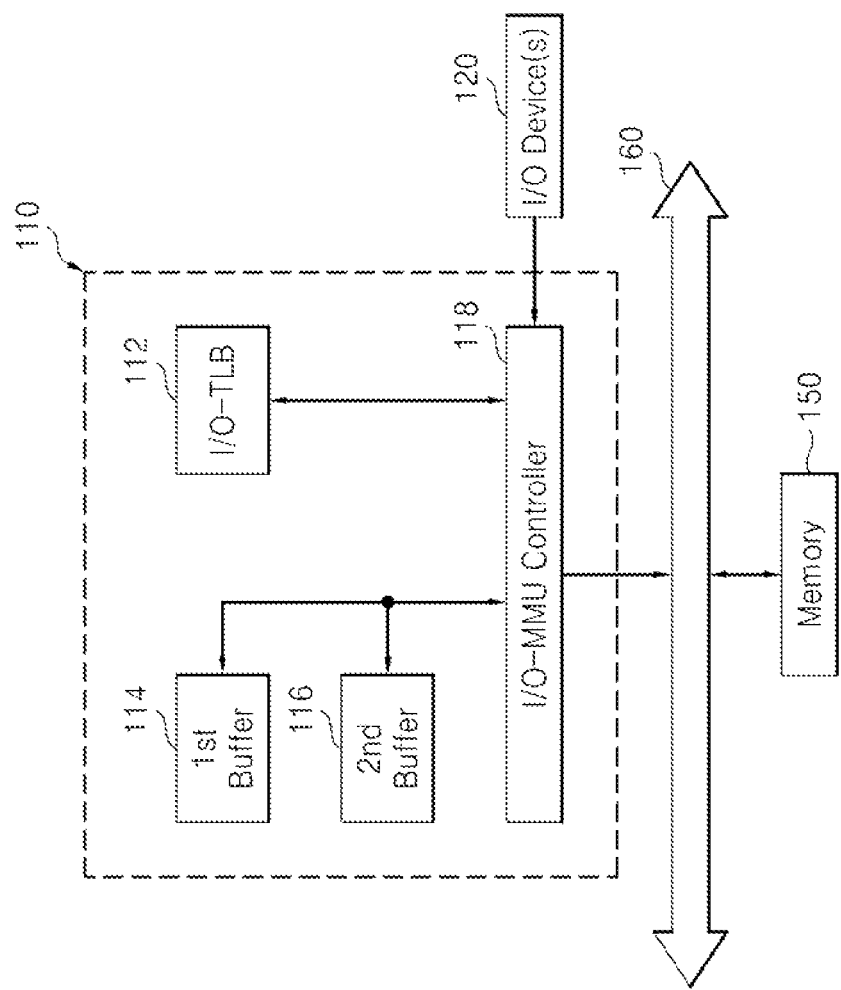
FIG. 2 is a block diagram of the input/output memory management unit (I/O-MMU) shown in FIG. 1.
Figure 3A:
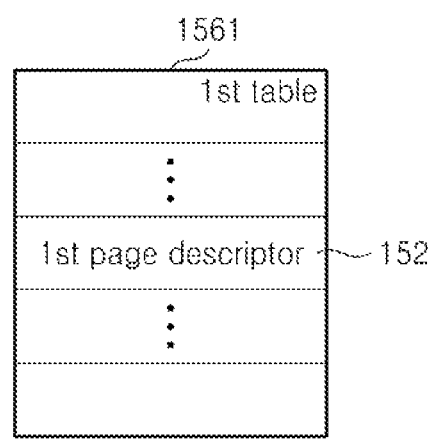
FIGS. 3A and 3B show the entries in the first table and the second table, respectively, shown in FIG. 1.
Figure 3B:
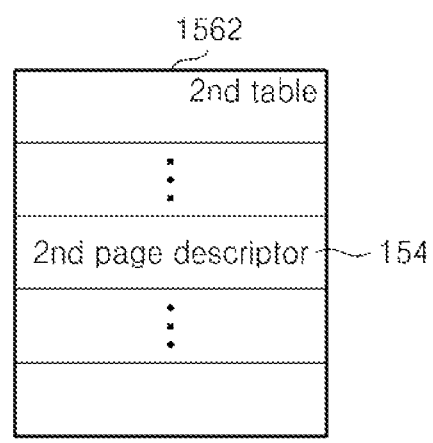
Figure 3C:
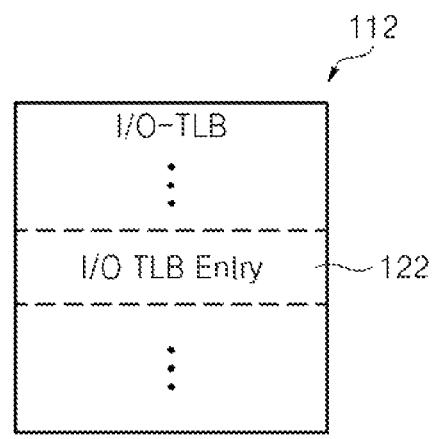
FIG. 3C shows the entries in an input/output translation lookaside buffer (I/O-TLB) shown in FIG. 2.

FIG. 1 is a block diagram of a memory system 100 according to some exemplary embodiments of the present invention. FIG. 2 is a block diagram of the input/output memory management unit (I/O MMU) 110 shown in FIG. 1. FIGS. 3A and 3B show the entries of the first table 1561 and the second table 1562, respectively, shown in FIG. 1. FIG. 3C shows the entries of the input/output translation lookaside buffer (I/O-TLB) 112 shown in FIG. 2.

Referring to FIG. 1, the memory system 100 includes the I/O MMU 110, at least one I/O device 120, an MMU 130, a central processing unit (CPU) 140, and a memory 150.

The memory system 100 may be an electronic system such as a portable terminal, a digital camera, a notebook computer, a personal computer (PC), a cellular phone, or a personal digital assistant (PDA) but is not limited thereto.

In the memory system 100, i.e., a paged memory system, data is usually grouped into blocks of memory referred to as pages that have a predetermined length. For instance, the minimum address unit of memory may be one byte and a sequential address set may be a sequential memory byte set, and therefore, a page may be defined as a block composed of a predetermined number of sequential memory bytes.

When the CPU 140 generates a virtual address, the MMU 130 translates the virtual address into a physical address of the memory 150 and accesses the memory 150. The memory 150 may be implemented as a dynamic random access memory (DRAM) and non-volatile memory (NVM). The NVM may be electronically erasable programmable read-only memory (EEPROM), flash memory, magnetic RAM (MRAM), spin-transfer torque MRAM, ferroelectric RAM (FeRAM), phase-change RAM (PRAM), resistive RAM (RRAM), nanotube RRAM, polymer RAM, nano floating gate memory, holographic memory, molecular electronics memory device, or insulator resistance change memory. When the at least one I/O device 120 generates a virtual address, the I/O MMU 110 translates the virtual address into a physical address in the memory 150 and accesses the memory 150.

As illustrated in FIG. 1, the CPU 140 and the at least one I/O device 120 are respectively connected to the memory 150 through different separate paths. For instance, the at least one I/O device 120 is not connected to the memory 150 through the MMU 130.

Referring to FIG. 1 and FIGS. 3A and 3B, the memory 150 includes a page table 156. The page table includes the first table 1561 and the second table 1562. The first table 1561 includes first page descriptors 152 and the second table 1562 includes second page descriptors 154. Here, the first page descriptors 152 and the second page descriptors 154 exist as entries in the first table 1561 and the second table 1562, respectively.

Each of the first page descriptors 152 manages a virtual address input through the MMU 130 or through the I/O MMU 110 in a predetermined management size (e.g., 1 MB). The predetermined management size (e.g., 1 MB) includes an address indicating second page descriptors 154.

The second page descriptors 154 manage a virtual address input from the first page descriptors 152 in a predetermined management size (e.g., 4 KB). The predetermined management size (e.g., 4 KB) indicates entries of the page table 156, e.g., the second table 1562.

The first page descriptors 152 and the second page descriptors 154 will be described in detail with reference to FIGS. 4A and 4B later.

In the exemplary embodiments of the present invention, the first page descriptors 152 and the second page descriptors 154 are the entries of the page table 156, but the scope of the present invention is not limited to the exemplary embodiments. The first page descriptors 152 and the second page descriptors 154 may be located outside the page table 156.

Referring to FIGS. 2 through 3C, the I/O MMU 110 includes the I/O-TLB 112, a first buffer 114, a second buffer 116, and an I/O-MMU controller 118.

The I/O-TLB 112 searches for an I/O-TLB entry 122 matching a virtual address input from the at least one I/O device 120. Alternatively, the I/O-TLB 112 may search the first buffer 114 and the second buffer 116 for information matching a virtual address input from the at least one I/O device 120. When there is an I/O-TLB 'hit' as the result of the searching, (i.e., when an I/O-TLB entry including a physical address corresponding to the virtual address is found), the physical address is detected in the I/O-TLB 112. When there is an I/O-TLB 'miss' as the result of the searching, (i.e., when no I/O-TLB entry including the physical address corresponding to the virtual address is found), the I/O-TLB 112 accesses the memory 150 through the I/O-MMU controller 118 and a system bus 160, stores an entry of the first table 1561 corresponding to the virtual address in the first buffer 114 using a first page descriptor 152, and stores an entry of the second table 1562 corresponding to the virtual address in the second buffer 116 using a second page descriptor 154.

In this exemplary embodiments, the entry of the first table 1561 corresponding to the virtual address is stored in the first buffer 114 using the first page descriptor 152 and the entry of the second table 1562 corresponding to the virtual address is stored in the second buffer 116 using the second page descriptor 154, but the scope of the present invention is not limited to the exemplary embodiments.

The second buffer 116 stores at a time a plurality of entries corresponding to sequential virtual addresses among the entries of the second table 1562. For instance, the second buffer 116 may fetch 32 page entries at a time from the second table 1562 and store them. In particular, when the at least one I/O device 120 is an image rotator, even if information of sequential page entries is read and stored in the second buffer 116, it is certain that the information of the page entries will be sequentially stored. Accordingly, it is efficient to store a plurality of entries in the second buffer 116 at a time.

Alternatively, the first buffer 114 and the second buffer 116 may be integrated into a single buffer.

When a subsequent virtual address is input thereafter, the I/O-TLB 112 may determine an I/O-TLB 'hit' or 'miss' using information stored in the first buffer 114 and the second buffer 116.

Figure 4A:
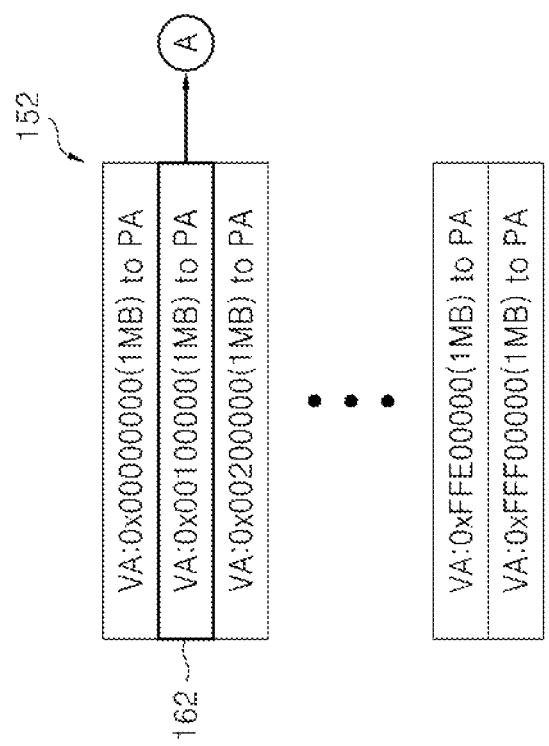
FIG. 4A shows the entries of the first table for first page descriptors illustrated in FIG. 3A.

FIG. 4A shows the entries of the first table 1561 for the first page descriptors 152 illustrated in FIG. 3A. FIG. 4B shows the entries of the second table 1562 for the second page descriptors 154 illustrated in FIG. 3B.

Figure 5:
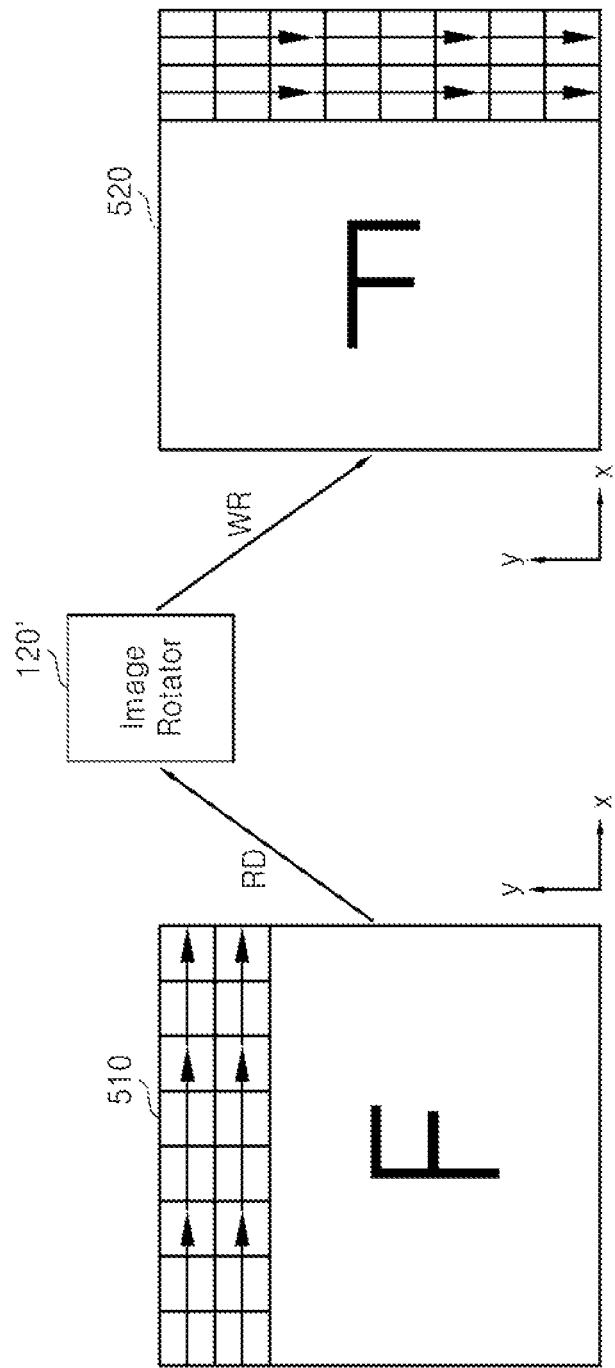
FIG. 5 is a diagram for explaining the effect of some embodiments of the present invention.

FIG. 5 is a diagram for explaining the effect of some embodiments of the present invention. In FIG. 5, an image rotator 120' is illustrated as an example of the I/O device 120.

Figure 4B:
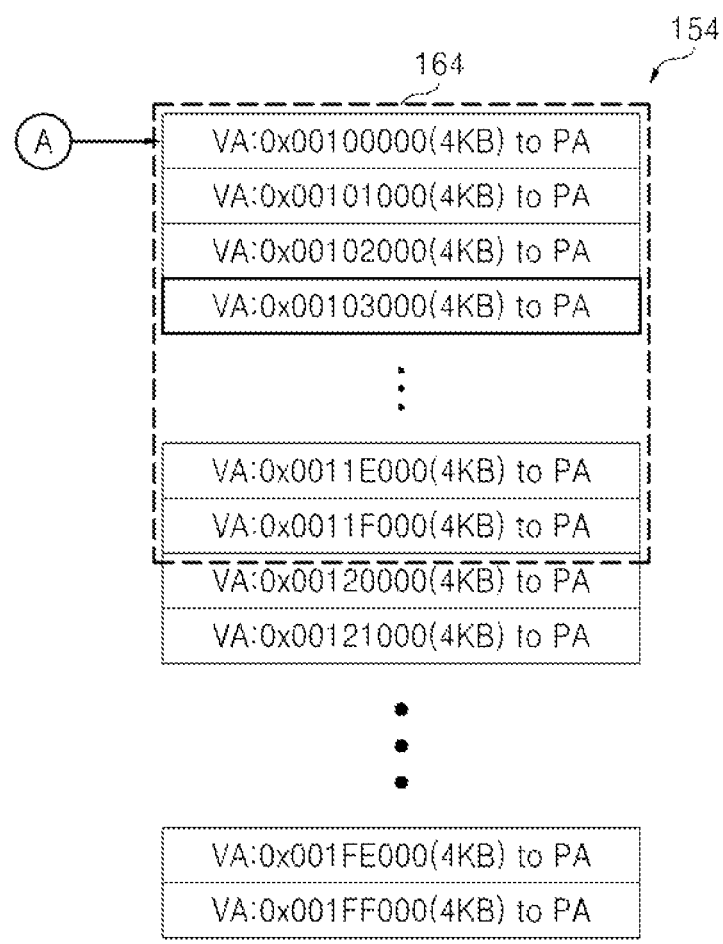
FIG. 4B shows the entries of the second table for second page descriptors illustrated in FIG. 3B.

Referring to FIGS. 4A and 4B, when a virtual address VA generated by the I/O device 120 illustrated in FIG. 1 for a read transaction is, for example, a hexadecimal value of 0x00103000, the first page descriptors 152 may indicate entries 162 corresponding to the virtual address VA in the first table 1561.

For instance, taking upper bits of the virtual address VA into account, the first page descriptors 152 may indicate entries 162 corresponding to 0x00100000 in the first table 1561. The second page descriptors 154 may indicate 32 entries 164 from 0x00100000 to 0x0011F000 in the second table 1562.

Referring back to FIG. 2, the first buffer 114 may store the entries 162 of the first table 1561 and the second buffer 116 may store 32 entries 164 at a time of the second table 1562. Consequently, when the I/O device 120 is the image rotator 120', the I/O MMU 110 can determine an I/O-TLB 'hit' or 'miss' based on only a start address portion (e.g., 0x001) since virtual addresses stored in the first and second buffers 114 and 116 are always sequential. Accordingly, the memory system 100 can determine the I/O-TLB 'hit' or 'miss' without a special device such as a content-addressable memory (CAM).

When the operation can be carried out only with the I/O-TLB 112 since the size of data input to the I/O MMU 110 is small, it is necessary to disable the first and the second buffers 114 and 116. In that case, whether to disable the first and the second buffers 114 and 116 is determined using software separately stored in a storage device, and the first and the second buffers 114 and 116 are disabled when necessary.

When a 'miss' is determined with respect to the first and the second buffers 114 and 116, (i.e., when information corresponding to a virtual address is not in any of the first and the second buffers 114 and 116), the I/O MMU 110 may discard all information previously stored in both the first and the second buffers 114 and 116 and store new information obtained by performing the procedure described with reference to FIGS. 4A and 4B in the first and the second buffers 114 and 116.

Referring to FIG. 5, the image rotator 120' rotates a first image 510 to generate a second image 520 and stores the second image 520 in a memory. The character "F" in FIG. 5 is just illustrated to show the relative orientation of the images 510 and 520.

The image rotator 120' reads (RD) data in a first direction (see horizontal arrow) along the x-axis with respect to the first image 510 and writes (WR) the data in a second direction (see vertical arrow) along the y-axis with respect to the second image 520. The scope of the present invention is not limited to the exemplary embodiments. The image rotator 120' may read (RD) the data in the second direction along the y-axis with respect to the first image 510 and write (WR) the data in the first direction along the x-axis with respect to the second image 520.

In a comparison example, when an image rotator reads the data along the x-axis with respect to the first image 510, it reads the data in a small unit (e.g., 16 bytes). For instance, when a single pixel is composed of 4 bytes and a single line along the x-axis is composed of 1024 pixels in the first image 510, the single line along the x-axis has a size of 4 KB.

If the image rotator reads the data in a small unit (e.g., 16 bytes) when rotating the first image 510, 16 bytes of the first image 510 read in a first read operation are separated by 4 KB from the 16 bytes of the first image 510 read in a second read operation. Accordingly, the first read operation and the second read operation are located at different entries by page descriptors.

Consequently, a read delay occurs when the image rotator of the comparison example is used. However, the image rotator 120' according to the embodiments of the present invention reads data in a large unit at a time using the first and the second buffers 114 and 116 and is thus more efficient than the image rotator of the comparison example.

Figure 6:
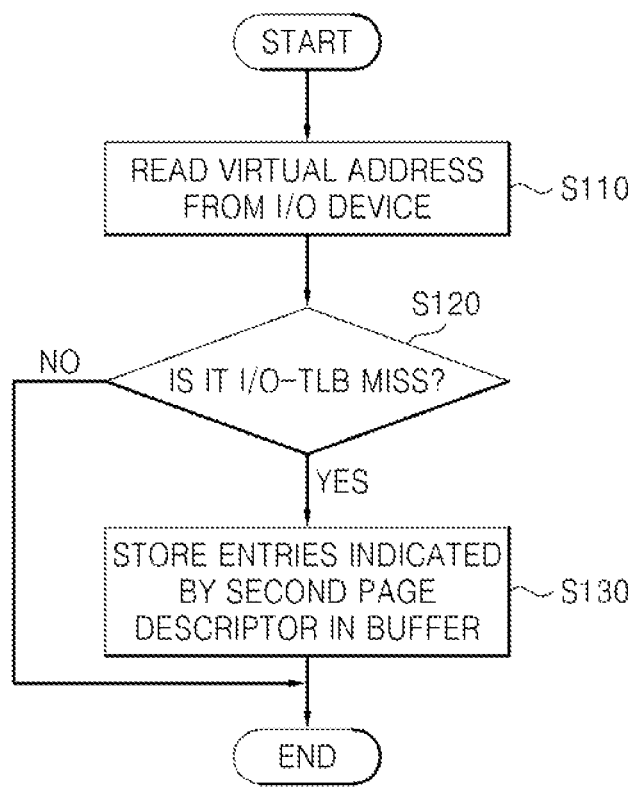
FIG. 6 is a flowchart of an operating method of a memory system according to some embodiments of the present invention.

FIG. 6 is a flowchart of an operating method of a memory system according to some embodiments of the present invention. The operating method illustrated in FIG. 6 may be performed by the memory system 100 illustrated in FIGS. 1 and 2.

The I/O MMU 110 of the memory system 100 reads a virtual address from the at least one I/O device 120 in step S110.

An I/O-TLB entry matching the virtual address is searched for and an I/O-TLB 'miss' or 'hit' is determined in step S120. When the I/O-TLB 'miss' is determined, (when there is not the I/O-TLB 'hit'), a physical address is searched for in the I/O-TLB 112, the first buffer 114 or the second buffer 116.

When there is the I/O-TLB 'miss', a plurality of sequential entries in a predetermined size indicated by a page descriptor (e.g., a second page descriptor 154) are stored in a buffer (e.g., the first buffer 114 and the second buffer 116) in step S130. At this time, before storing the plurality of sequential entries in the predetermined size, information that was previously stored in the buffer is discarded.

The operating method may be performed using software (i.e., executable code) stored in a separate storage device, but the present invention is not limited thereto.

Figure 7:
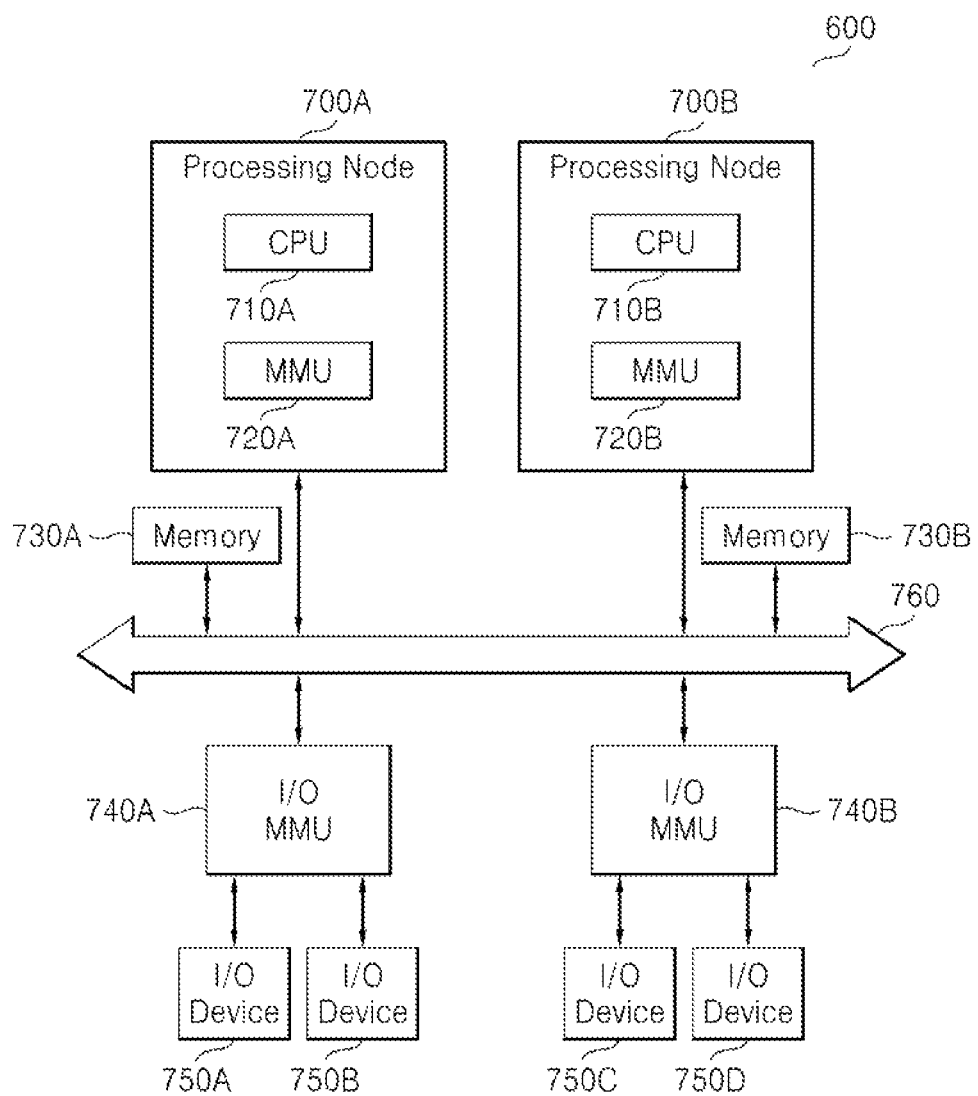
FIG. 7 is a block diagram of a memory system according to other embodiments of the present invention.

FIG. 7 is a diagram of a memory system 600 according to other embodiments of the present invention. Referring to FIG. 7, the memory system 600 includes a first processing node 700A, a second processing node 700B, a first memory 730A, a second memory 730B, a first I/O MMU 740A, a second I/O MMU 740B, and a plurality of I/O devices 750A, 750B, 750C and 750D.

The first processing node 700A includes a first CPU 710A and a first MMU 720A. The second processing node 700B includes a second CPU 710B and a second MMU 720B.

The first processing node 700A and the second processing node 700B are connected with the first memory 730A, the second memory 730B, the first I/O MMU 740A and the second I/O MMU 740B via a system bus 760. Only the first I/O MMU 740A is connected directly to the I/O devices 750A and 750B and only the second I/O MMU 740B is connected directly to the I/O devices 750C and 750D. The first and the second I/O MMU 740A and 740B may each correspond to and have the structure and function of the I/O MMU 110 illustrated in FIG. 1.

When the first and the second CPUs 710A and 710B generate virtual addresses, respectively, the first and the second MMUs 720A and 720B respectively translate the virtual addresses into physical addresses and respectively access the first and the second memories 730A and 730B.

When the I/O devices 750A, 750B, 750C and 750D generate virtual addresses, the first and the second I/O MMUs 740A and 740B translate the virtual addresses into physical addresses and access the first and the second memories 730A and 730B. The first and the second memories 730A and 730B may be DRAM but are not limited thereto. The memories 730A and 730B may include non-volatile memory (NVM). The NVM may be electronically erasable programmable read-only memory (EEPROM), flash memory, magnetic RAM (MRAM), spin-transfer torque MRAM, ferroelectric RAM (FeRAM), phase-change RAM (PRAM), resistive RAM (RRAM), nanotube RRAM, polymer RAM, nano floating gate memory, holographic memory, molecular electronics memory device, or insulator resistance change memory.

Although the memory system 600 includes the two processing nodes 700A and 700B in the exemplary embodiments, the present invention is not limited to the exemplary embodiments. The memory system 600 may include more than two processing nodes.

Figure 8:
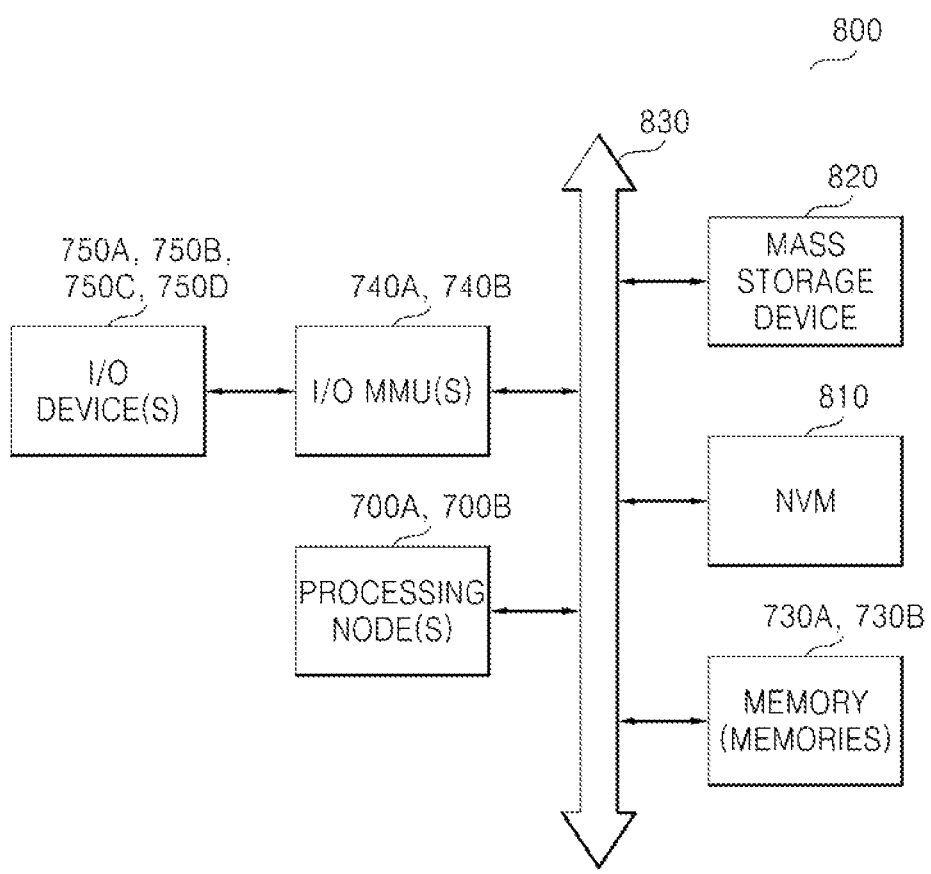
FIG. 8 is a block diagram of an electronic system according to other embodiments of the present invention.

FIG. 8 is a diagram of an electronic system 800 according to other embodiments of the present invention. Referring to FIGS. 7 and 8, the electronic system 800 includes the memories 730A and 730B, an NVM 810, a mass storage device 820, the processing nodes 700A and 700B, the I/O MMUs 740A and 740B, and the I/O devices 750A, 750B, 750C and 750D. The elements of the electronic system 800 are connected with one another via a bus 830.

The NVM 810 may be implemented as flash memory, PRAM or MRAM. The mass storage device 820 may be implemented as a solid state drive (SSD), a hard disk drive (HDD), and a network-attached storage (NAS).

The NVM 810 or the mass storage device 820 may store a system operating system (OS) and application specific software. For instance, the NVM 810 or the mass storage device 820 may store software that can disable the first buffer 114 and the second buffer 116 illustrated in FIG. 2 when necessary.

The software may include an algorithm for executing the operating method of the electronic system 800.

Here, particular components of the electronic system 800 may be changed and the components of the electronic system 800 are not limited to the devices illustrated in FIG. 7 and may include additional devices.

As described above, according to some embodiments of the present invention, performance deterioration of a memory system is improved and the memory system includes an I/O MMU that can be used for an I/O device.

While the present invention has been particularly shown and described with reference to exemplary embodiments thereof, it will be understood by those of ordinary skill in the art that various changes in forms and details may be made therein without departing from the spirit and scope of the present invention as defined by the following claims.

What is claimed is:

1. A memory system comprising:
    a memory; and
    an input/output memory management unit (I/O MMU) connected to the memory, and configured to receive a virtual address from an image rotator and configured to translate the virtual address into a physical address in the memory,
    wherein the memory includes a page table for storing entries matching the virtual addresses, and the page table comprises a first table that includes entries indicated by a first page descriptor, and a second table that includes entries indicated by a second page descriptor,
    wherein the I/O MMU includes a first buffer configured to only store a first entry in the first table that corresponds to the virtual address and is indicated by the first page descriptor, and a second buffer configured to store a plurality of second entries in the second table that correspond to the sequential virtual addresses and are indicated by the second page descriptor,
    wherein for translation of the virtual address, the I/O MMU searches within the I/O MMU for an entry matching the virtual address, and
    if no entry matching the virtual address is found within the I/O MMU as a result of searching within the I/O MMU for the entries, the I/O MMU accesses the memory, searches the memory for entries matching the virtual address, and stores the entries matching the virtual address into the I/O MMU.

2. The memory system of claim 1, wherein the first page descriptor manages an entry corresponding to the virtual address in a predetermined management size.

3. The memory system of claim 1, wherein the second page descriptor manages a plurality of entries that correspond to an entry indicated by the first descriptor corresponding to the virtual address, in a predetermined management size.

4. The memory system of claim 1, further comprising at least one I/O Device configured to transmit the virtual address to the I/O MMU.

5. A memory system comprising:
    a memory management unit (MMU) connected to a memory and manage a central processing unit (CPU)'s access to the memory; and
    an input/output MMU (I/O MMU) connected to the memory, and manage an image rotator's access to the memory,
    wherein the MMU is configured to receive a first virtual address from the CPU, and configured to map the first virtual address to a first physical address in the memory,
    wherein the I/O MMU is configured to receive a second virtual address and to map the second virtual address to a second physical address in the memory by searching outside of the memory for a plurality of entries matching the second virtual address, and
    wherein the memory includes a page table for storing entries matching the virtual addressees and the page table comprises a first table that includes entries indicated by a first page descriptor, and a second table that includes entries indicated by a second page descriptor,
    wherein the I/O MMU includes a first buffer configured to only store a first entry in the first table that corresponds to the virtual address and is indicated by the first page descriptor, and a second buffer configured to store a plurality of second entries in the second table that correspond to the sequential virtual addresses and are indicated by the second page descriptor, if no entry matching the second virtual address is found in the I/O MMU as a result of the searching outside of the memory to map the second virtual address, accessing the memory, searching the page table for the entries matching the second virtual address, and storing the found at least one entry outside of the memory.

6. The memory system of claim 5, wherein the first page descriptor manages an entry corresponding to the second virtual address in a predetermined management size.

7. The memory system of claim 5, wherein the second page descriptor manages a plurality of entries, which correspond to an entry indicated by the first descriptor corresponding to the second virtual address, in a predetermined management size.

8. The memory system of claim 6, wherein the predetermined management size is configured to be 1 MB.

9. The memory system of claim 7, wherein the predetermined management size is configured to be 4 KB.

10. An operating method of a memory system, the operating method comprising the steps of:
  an input/output memory management unit (I/O MMU) reading a virtual address from an image rotator;
  an input/output memory management unit (I/O MMU) searching for an input/output translation lookaside buffer (I/O-TLB) entry matching the virtual address and determining an I/O-TLB miss or hit; and
  if the I/O-TLB search results in a I/O-TLB miss, accessing a memory, searching a page table therein for a plurality of entries corresponding to the virtual address, and storing the found entries in an internal buffer of the I/O MMU, wherein the memory includes a page table for storing entries matching the virtual addressees and the page table comprises a first table that includes entries indicated by a first page descriptor, and a second table that includes entries indicated by a second page descriptor,
  wherein the I/O MMU includes a first buffer configured to only store a first entry in the first table that corresponds to the virtual address and is indicated by the first page descriptor, and a second buffer configured to store a plurality of second entries in the second table that correspond to the sequential virtual addresses and are indicated by the second page descriptor.

11. The operating method of claim 10, further comprising emptying the internal buffer if information has been previously stored in the internal buffer, before storing the entries in the internal buffer.

12. The memory system of claim 1, wherein the I/O MMU determines whether the entry is store within the I/O MMU based on a portion of the virtual address.

13. The memory system of claim 1, wherein the memory is a non-volatile memory.

14. The memory system of claim 5, wherein the I/O MMU determines whether the entry is store within the I/O MMU based on a portion of the virtual address.

15. The memory system of claim 5, wherein the memory is a non-volatile memory.

16. The operating method of claim 10, wherein the I/O MMU determines whether the entry is store within the I/O MMU based on a portion of the virtual address.

17. The operating method of claim 10, wherein the memory is a non-volatile memory.

* * * * *